Sept. 14, 1926.
H. KLOTZ
VEHICLE TOWING MEMBER
Filed April 14, 1926
1,599,535
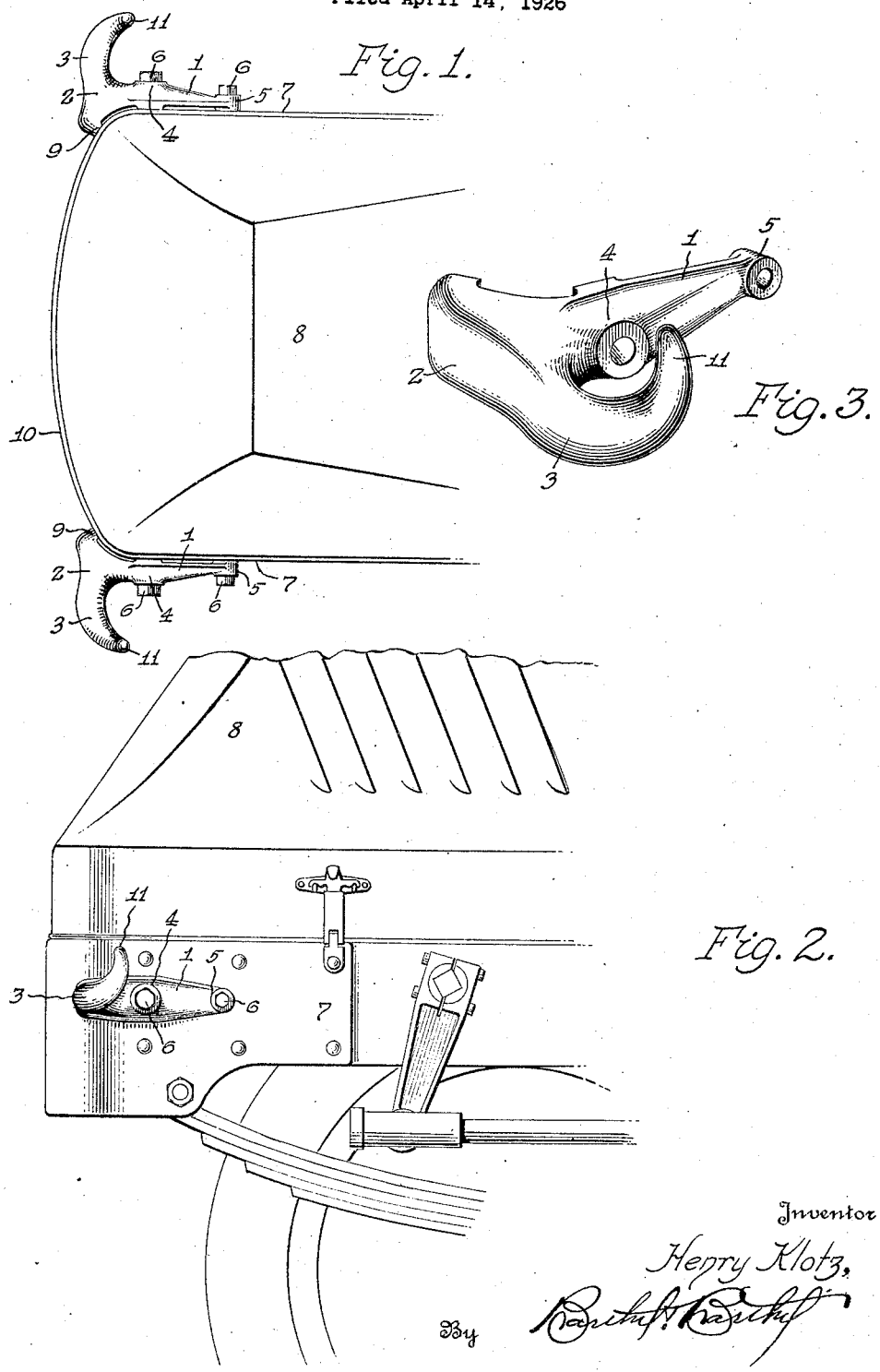

Patented Sept. 14, 1926.

1,599,535

UNITED STATES PATENT OFFICE.

HENRY KLOTZ, OF DETROIT, MICHIGAN.

VEHICLE TOWING MEMBER.

Application filed April 14, 1926. Serial No. 101,894.

This invention relates to vehicle towing members, and has special reference to hook shaped members that may be attached to the ends of a truck or similar vehicle for towing or otherwise moving a towed or adjacent vehicle. In the operation of heavy trucks, it is often desirable to tow another truck or vehicle by the use of chains or connecting members. Then again, a powerful truck is often used to assist another truck or vehicle that has become stalled or its power placed out of commission.

The primary object of my invention is to provide a set of towing members that can be easily attached to the end of a truck at such places where the truck chassis, frame or other parts will not be unduly subjected to stresses and strains that would injure the truck. With this end in view, the towing members have securing legs, fulcrum legs and hooks at the juncture of said legs and coextensive of the fulcrum legs, so that in a towing operation the fulcrum legs will prevent any shearing action of the fastening means of the securing legs.

A further object of my invention is to provide vehicle towing members having upturned hooks that will prevent displacement of towing chains or other flexible members placed on the hooks.

The above and other objects are attained by a simple, durable and inexpensive construction that will be hereinafter specifically described and then claimed, and reference will now be had to the drawing, wherein—

Figure 1 is a plan of the front end of a truck provided with a set of towing members in accordance with this invention;

Fig. 2 is a side elevation of the same; and

Fig. 3 is a perspective view of a detached towing member.

Each towing member comprises a securing leg 1, a fulcrum leg 2, and a hook 3. The securing leg 1 tapers from its forward end to its rear end and is formed with apertured bosses 4 and 5 so that nut equipped bolts 6 or other fastening means may be employed for attaching the securing leg to the side 7 of a truck 8 or other vehicle.

For the purposes of illustrating an installation of the towing members, there is illustrated the front end of a well known type of powerful truck and the towing members have a configuration to fit the front corners of the truck, as best shown in Fig. 1. The fulcrum leg 2 is a curved continuation of the securing leg 1 and said fulcrum leg extends inwardly from the sides 7 of the truck 8 and has a bearing portion 9 engaging the front side 10 of the truck.

The hook 3 extends outwardly in an opposite direction from the fulcrum leg 2 and is in substantially the same horizontal plane as the legs 1 and 2. The shank of the hook is curved rearwardly and its bill 11 upturned so that any chain link, loop or other form of flexible towing member placed on the shank of the hook cannot become accidentally displaced.

Pulling on the hooks 3 causes the fulcrum legs 2 to firmly bear against the front side 10 of the truck and the nut equipped bolts 6 are not subjected to any shearing action by the securing legs 1. The bolts simply retain the securing legs against the sides of the truck and resist any outward movement of the securing legs incident to any fulcrum action of the legs 2.

Obviously the towing members are made of very durable metal and the legs 1 and 2 are shaped so as to properly fit the corner construction of a truck or other vehicle to which the towing members are to be applied. Only one embodiment of my invention has been illustrated, but it is to be understood that the towing members are susceptible to such variations and modifications as fall within the scope of the appended claims.

What I claim is:—

1. As an article of manufacture, a towing member comprising a securing leg, a fulcrum leg, and a hook at the juncture of said legs, said legs and hook being in substantially the same plane and said hook having an upturned bill.

2. The combination of a vehicle, towing members carried by an end of said vehicle, each towing member comprising a side leg secured to the side of the vehicle, a fulcrum leg bearing against the end of the vehicle, and a hook coextensive of said fulcrum leg.

3. The combination called for in claim 2, wherein each hook has an upturned bill.

In testimony whereof I affix my signature.

HENRY KLOTZ.